Feb. 4, 1936. T. A. RICHARDSON ET AL 2,029,388
HEAD SHAPING MACHINE
Filed June 30, 1934
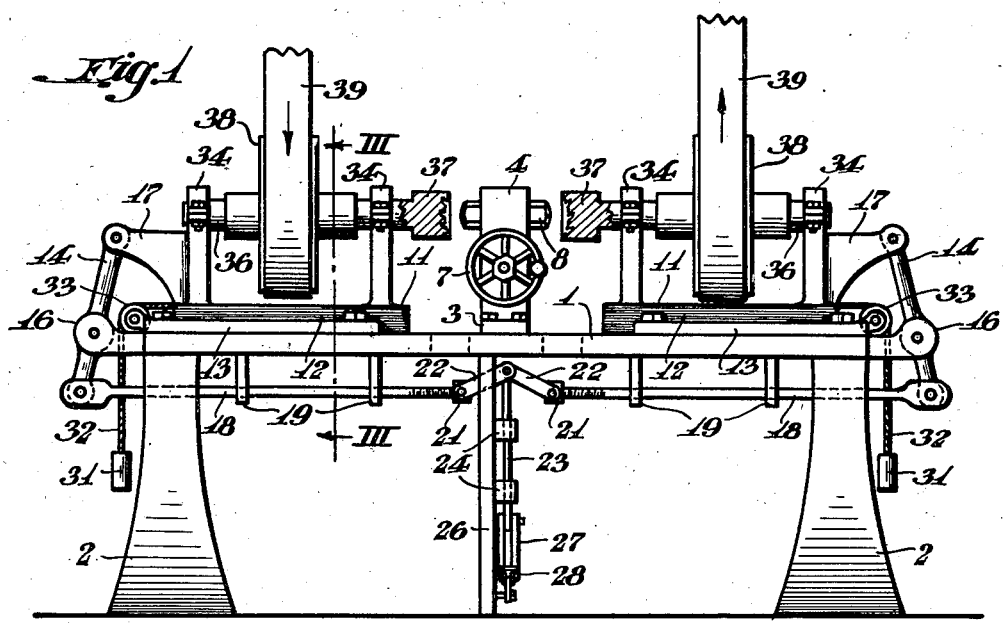
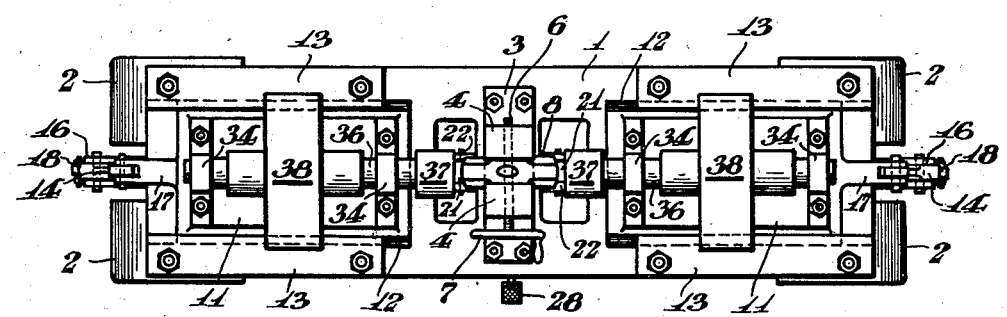
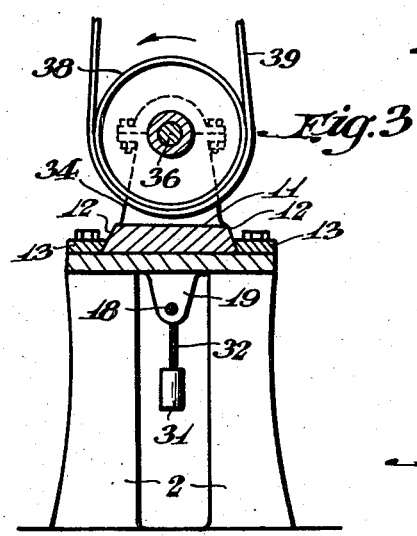
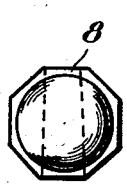
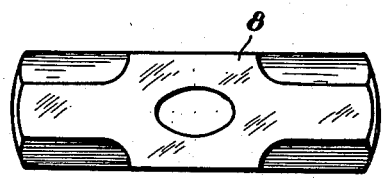
INVENTORS
Thomas A. Richardson
Charles W. Dawson
By Brown, Critchlow & Flick
their ATTORNEYS Patented Feb. 4, 1936

2,029,388

UNITED STATES PATENT OFFICE 2,029,388

HEAD SHAPING MACHINE

Thomas A. Richardson, Verona, and Charles W. Dawson, Oakmont, Pa., assignors to Woodings-Verona Tool Works, Verona, Pa., a corporation of Pennsylvania Application June 30, 1934, Serial No. 733,268

1 Claim. (Cl. 90—14)

This invention relates to metal cutting and shaping machinery.

The driving ends of the heads of mauls used particularly in driving railroad spikes are generally convex throughout the major portion of their areas. It has been the practice to form these heads by forging operations followed by machining the ends to give the desired convexity. Heretofore, the machining operation has been carried out by mounting a head in a lathe and turning first one end and then the other against a machine tool held in a chuck. This method has resulted in a material waste of time due to the shaping of only one end of a head at a time and to the necessity for removal of the head from the lathe in order to turn it around. This same machining method with its disadvantages has been followed in reshaping the worn ends of used maul heads.

It is among the objects of this invention to provide a machine for shaping the ends of spike maul heads which acts on both ends of a head without turning the head around; which shapes both ends simultaneously; which is easily and rapidly operated by a single operator; and which is simple in design, relatively inexpensive, and durable.

The preferred embodiment of a machine embodying the invention is illustrated in the accompanying drawing of which Fig. 1 is a side view; Fig. 2 a plan view; Fig. 3 a view taken on the line III—III of Fig. 1; Fig. 4 a side view of a spike maul head; and Fig. 5 an end view of a maul head.

Referring to the first two figures of the drawing, an elongate bed plate 1 is supported at its corners by four standards 2. Rigidly mounted on the center of the bed plate is a chuck including a support 3 on which clamps 4 are slidably mounted in the usual manner for movement transversely of the bed plate. These clamps are movable toward and away from each other by means of a screw 6 extending horizontally therethrough and operated by a hand-wheel 7. The inner faces of the clamps are suitably shaped for registering with the opposite sides of a spike maul head 8 such as is shown in Fig. 4. As shown in Figs. 1 and 2, the maul head is gripped and supported at its center portion with its ends unobstructed and projecting from the opposite sides of the chuck, thus making it possible to work on both ends of the maul head at the same time. This is an important feature of this invention.

Tool carriages 11 are slidably mounted on each end of the bed plate, the sides 12 of the carriage bases being inclined downward and outward under guide bars 13 that are securely connected to the top of the bed plate along its sides (Fig. 3), whereby the carriages are confined to movement in a straight line toward and away from the chuck between them. The carriages are simultaneously moved toward each other and the chuck by manually operable means including substantially upright levers 14 fulcrumed in brackets 16 extending outwardly from the ends of the bed plate, the upper ends of the levers being connected to outwardly extending portions 17 of the carriages above the brackets. The lower end of each lever is pivoted in the bifurcated end of a horizontally disposed shaft 18, reciprocable longitudinally in hangers 19 depending from the bottom of the bed plate. The inner ends of these shafts are threaded for the reception of nuts 21 which are connected by toggle links 22, the nuts being turned on shafts 18 the proper distance to give the desired space between the shafts.

Suspended from the center pivot of the toggle is a rod 23 which is vertically reciprocable in brackets 24 projecting laterally from the side of a support 26 beneath the center of the bed plate. The lower end of this rod is pivotally connected by means of a stirrup 27 to the central portion of a foot pedal 28 which is pivoted to support 26 at its rear end. Thus, when the foot pedal is depressed the toggle links are brought into axial alignment, which forces the inner ends of shafts 18 further apart, and this outward movement of the shafts swings the upper ends of levers 14 inwardly, thereby simultaneously pushing the two tool carriages toward the chuck. When the foot pedal is released, the carriages are automatically drawn outwardly away from each other by means of counterweights 31. These are attached to the outer ends of the carriages by cables 32 which run over pulleys 33 journaled in the ends of the bed plate.

In order to form a smooth convex area, such as is shown in Fig. 5, on each end of spike maul head 8 held in the chuck, each carriage is provided with a pair of pedestal bearings 34 in which is journaled a horizontal shaft 36 carrying a milling cutter 37 on its inner end, the cutting face of the tool being concave. For driving the cutters, a pulley 38 is keyed on each cutter shaft 36 and is rotated by a belt 39 which is driven from a line shaft or the like. Preferably, the two cutters are driven in opposite directions so that when they are moved into cutting engagement with the ends of maul head 8 by the operator's depressing of the foot pedal, the torque on the opposite ends of the maul head is in opposite directions, whereby it neutralizes itself and relieves the chuck from strain. If difficulty is experienced in exactly centering the maul head in the chuck, clamps 4 can be left just loose enough to permit the head to be moved transversely of the chuck by the first milling cutter to engage it until the head engages the other cutter, whereby the head is centered by the cutters so that they engage both of its ends with equal pressure. The operator can control the cutting pressure to secure maximum results without breakage, by foot pressure, and automatic release is secured by relieving the foot pressure.

A machine constructed in accordance with this invention decreases the cost of producing maul heads because time is saved in the end-shaping operation. Furthermore, the machine is simple in construction and operation, thereby resulting in low initial cost and low upkeep.

According to the provisions of the patent statutes, we have explained the principle and construction of our invention, and have illustrated and described what we now consider to represent its best embodiment. However, we desire to have it understood that, within the scope of the appended claim, the invention may be practiced otherwise than as specifically illustrated and described.

We claim:

A machine for shaping the ends of spike maul heads, comprising a bed plate, a pair of carriages slidably mounted thereon for movement toward and away from each other, a chuck mounted on the bed plate between the carriages for supporting a spike maul head, a milling cutter journaled in each carriage adjacent an end of said head, means for driving the cutters, a lever fulcrumed on each end of the bed plate and pivoted to the adjacent carriage, a pedal, means connecting the pedal to each lever for rocking the levers when the pedal is depressed and simultaneously moving the carriages toward each other to thereby bring the cutters into cutting engagement with the opposite ends of the maul head, and means for automatically moving the carriages away from said head when the pedal is released.

THOMAS A. RICHARDSON.
CHARLES W. DAWSON.